T. S. DUNN.
SPRING WHEEL FOR VEHICLES.
APPLICATION FILED NOV. 4, 1907.
927,511.
Patented July 13, 1909.
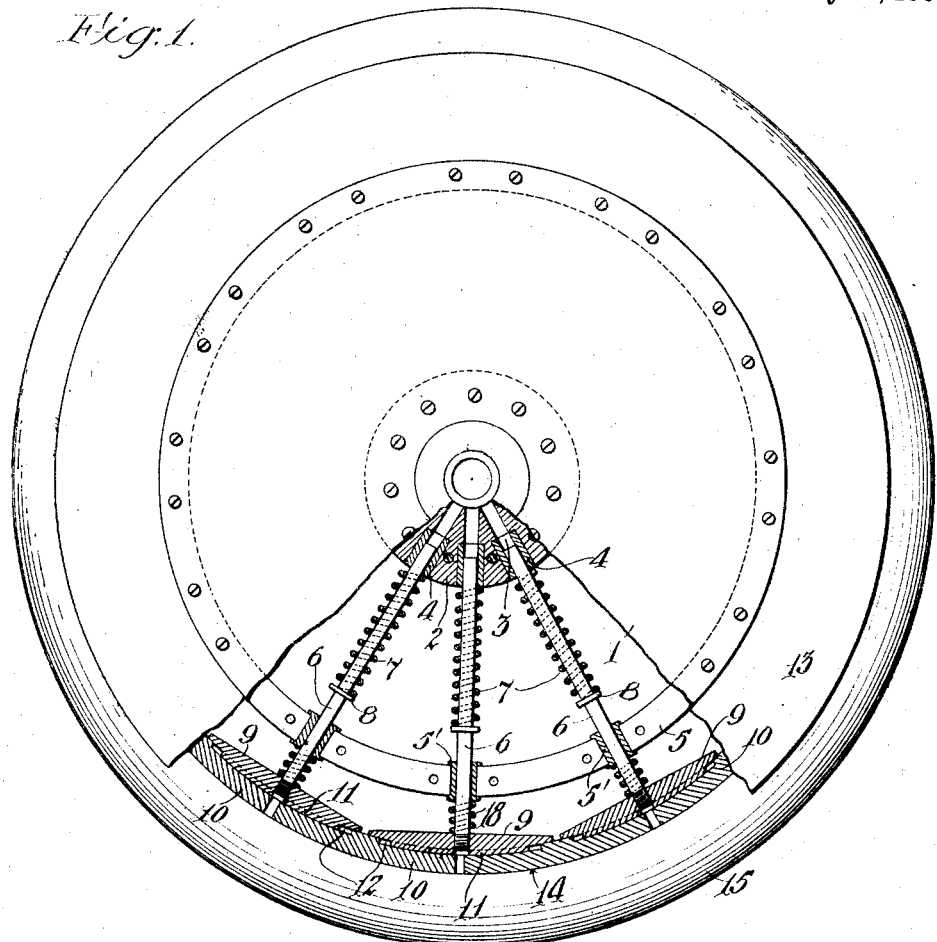
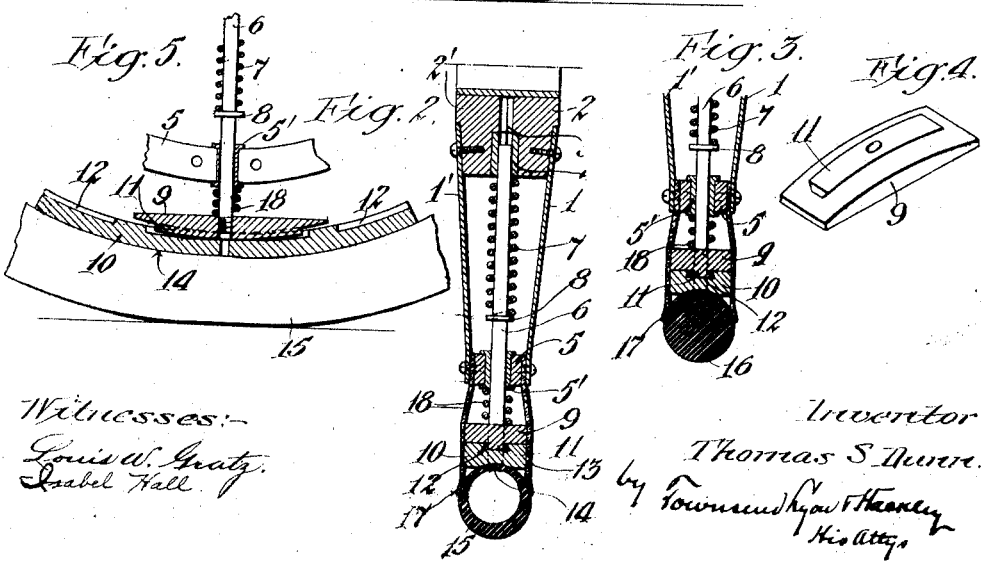
Witnesses:
Louis W. Gratz
Isabel Hall
Inventor
Thomas S. Dunn.
by Townsend & Thawley
His Attys

UNITED STATES PATENT OFFICE.

THOMAS S. DUNN, OF LOS ANGELES, CALIFORNIA, ASSIGNOR OF ONE-HALF TO GEORGE RENWICK, OF LOS ANGELES, CALIFORNIA.

SPRING-WHEEL FOR VEHICLES.

No. 927,511.  Specification of Letters Patent.  Patented July 13, 1909.

Application filed November 4, 1907. Serial No. 400,670.

*To all whom it may concern:*

Be it known that I, THOMAS S. DUNN, a citizen of the United States, residing at Los Angeles, in the county of Los Angeles and State of California, have invented a new and useful Spring-Wheel for Vehicles, of which the following is a specification.

The main object of this invention is to provide a vehicle wheel with means whereby the tire or rim yields automatically in passing over obstructions, the yielding being confined to the part adjacent to the ground, thus producing a similar effect to that of a pneumatic tire.

Another object of the invention is to provide for a smooth continuous transfer of the yielding action from point to point of the wheel circumference.

In the accompanying drawings:—Figure 1 is a side elevation, partly in section, of a wheel embodying the invention. Fig. 2 is a transverse, radial section showing a pneumatic tire. Fig. 3 is a similar view showing a solid tire. Fig. 4 is a detail view of one of the blocks or members of the wheel, and Fig. 5 is a section showing the position assumed by some of the parts in deformation under load.

The wheel comprises a hub to which are secured, by bolts, rivets or other suitable means, two disks or plates 1 and 1'. The hub is preferably formed from two twin members 2 and 2' which are similar to each other and provided with radially arranged recesses 3 which are adapted to face each other when the hub sections are secured in position, and thereby form spoke tubes. Bushings 4 may be secured in these tubes and are preferably formed in halves or sections with one section in the recesses of each of the hub sections 3.

The outer edges of the plates or disks 1, 1' are secured by bolts or otherwise to a rim 5 which is perforated in alinement with the grooves 3 and are preferably provided with bushings 5' the hub 2, 2', disks 1, 1', and rim 5 constitute a frame for support of the spoke bars. Reciprocally mounted in the tubes of the hub and perforations of the rim are rods or spoke bars 6, which are pressed outwardly by helical springs 7, the outer ends of each spring engaging with a stop 8. The outer end of each bar 6 carries a cross bar or cross head 9, each bar and head forming a radially movable spoke member.

Segments or blocks 10 are attached to or connected with the heads 9 in such manner, as by a loosely fitting dovetail, that a li..ited radial movement of the parts is permitted, as shown in Fig. 5 this dovetail forming a loose connection. The rib or tongue 11 of the dovetail does not extend to the ends of the head 9 and fits in the grooves 12 of the blocks 10 so loosely that the parts can readily assume the position shown in said figure without the blocks becoming separated from the heads, as in case of a breakage of the rim or tire each block 10 extends over two of the heads 9. In this manner the blocks become floating members between said heads and the tire, having a limited longitudinal movement owing to the spaces between their adjacent ends. The separation of the blocks 10 from the remainder of the wheel is also further prevented by flexible connectors, as annular disks 13 of leather, or other suitable material, the inner edge of each of which connector is secured between one of the side plates of the wheel and the rim 5, and the outer edge is secured to the side of the tire in any suitable manner as by cement or glue.

The outer face of each of the blocks 10, of the floating rim, is grooved as shown at 14 in which a pneumatic tire 15, or solid tire 16, may be seated in the usual manner. The inner face of the tire is forced into its seat 14 with sufficient pressure to prevent any movement between the blocks and the rim except the slight longitudinal movement of the blocks when any portion of its rim is compressed, as hereinbefore referred to. To permit of this seating of the tire and also to secure a larger area of contact between the tire and the annular disks 13, for securing them thereto, the outer edges of the disks are slightly flared outward as shown at 17. The strain of the disks over the sides of the heads 9 has a tendency to prevent the lateral movement of the blocks 10 which might occur owing to the looseness between the sides of the ribs 11 and the grooves 12.

Supplementary springs 18 may be provided between the cross head 9 and the bushings 5', to aid in the outward pressure of the bars, particularly where long spoke bars are used. The frame shown is adapted to use in different size wheels, the spoke bars 6 being replaced by longer spoke bars, and the springs 18 in this case being correspondingly longer. In case the longer spoke bars are of larger diameter, the bushings 4, 5' are replaced by thinner bushings. These bushings are also replaceable in case of wear.

In operation, the pressure of the wheel on the ground causes the lowermost sections or blocks 10 to be pressed inwardly toward the center of the wheel. Each block 10 as it is pressed in presses in the spoke bars 6 whose heads 9 engage with the block. Thus, if only one block is being pressed in the two spoke bars 6 whose heads 9 engage said block are pressed in. But if the joint between two blocks is at the bottom of the wheel, as shown in Fig. 5, so that two blocks are pressed in, then the three spoke bars whose heads 9 are engaged by these two blocks will be pressed in. Therefore at least two of the bars are always in action and the strain passes smoothly and continuously from each spoke bar to the next, in the rotation of the wheel. On the other hand the remaining bars and springs of the wheel are not affected, for the time being, so that breakage of any one part does not affect the operation of the other parts. Moreover, in case of breakage of the spring of one spoke bar, the blocks engaged by that bar may be fastened rigidly together by any suitable clamps, and the two then act as one section, transmitting the pressure to the spoke bars 6 at each side of the break.

In case a pneumatic tire is used with the wheel the device has the advantage that the tire is always held to the wheel even when the tire collapses by reason of puncture or for other causes. Under such conditions a rigid rim would allow the tire to slip off, but with the present construction the spoke members 6, 9 automatically move outward, taking up the slackness in the tire and retaining the latter in place.

What I claim is:—

1. A wheel comprising a frame, spoke bars radially movable therein, springs supported by said frame and pressing said spoke bars outwardly, pressure receiving members outside of the spoke bars, each of said pressure receiving members extending over and engaging two of the spoke bars, and a tongue and groove connection between the said pressure receiving member and each of the spoke bars with which it engages.

2. A wheel comprising a frame having spoke tubes, spoke bars movable in said tubes and each having a cross-head, springs supported by the frame for pressing the spoke bars outwardly, floating pressure receiving blocks each extending over two of the heads, and a loose dove-tail connection between each block and such two heads.

3. A wheel comprising a frame consisting of a rim, side members and a hub formed in halves, fastened together, the inner faces of said halves of the hub being grooved to form spoke tubes, removable bushings in said spoke tubes, spoke bars slidable in said bushings and each having a cross-head, springs in the tubes engaging the bushings in the hub and the spoke bars for pressing said bars outwardly, and pressure receiving blocks, each extending over and loosely connected to two of the cross-heads.

4. A wheel comprising a frame having a hub formed with spoke tubes, side plates and a rim, spoke bars movable in said spoke tubes and each having a cross head, springs engaging said hub and the spoke bars for pressing the spoke bars outwardly, a spring between each cross head and the aforesaid rim for pressing the spoke bar outwardly, and pressure receiving blocks, each extending over two of the heads, each block being loosely connected to the two heads over which it extends.

In testimony whereof, I have hereunto set my hand at Los Angeles, California, this 25th day of October 1907.

THOMAS S. DUNN.

In presence of—
FREDERICK S. LYON,
FRANK L. A. GRAHAM.